US005093674A

United States Patent [19]

Storlie

[11] Patent Number: 5,093,674

[45] Date of Patent: Mar. 3, 1992

[54] METHOD AND SYSTEM FOR COMPENSATING FOR PAPER SHRINKAGE AND MISALIGNMENT IN ELECTROPHOTOGRAPHIC COLOR PRINTING

[75] Inventor: Chris A. Storlie, Boise, Id.

[73] Assignee: Hewlett-Packard Company, Palo Alto, Calif.

[21] Appl. No.: 561,831

[22] Filed: Aug. 2, 1990

[51] Int. Cl.[5] .......... H04N 1/21

[52] U.S. Cl. .......... 346/108; 346/1.1; 355/272

[58] Field of Search .......... 346/1.1, 108, 107 R, 346/76 L, 160; 355/271, 272

[56] References Cited

U.S. PATENT DOCUMENTS 4,899,196 2/1990 Mahoney .......... 355/271

*Primary Examiner*—Mark J. Reinhart

[57] ABSTRACT

A method and system for controlling the alignment and registration of color images such as those of cyan, yellow, magenta, and black (C, Y, M, K) which are successively printed on a photoconductive drum and then transferred from the drum to paper during electrophotographic color printing. Each scccessive color image printed on paper is fused therein, and then vertical, horizontal and angular error signals are generated after each fusion. These error signals represent the difference between an original image reference position and the image position after each color image fusion into the paper. These error signals are then processed in a closed loop feedback control system in such a manner as to control the position and scan rate of a laser beam being projected onto the photoconductive drum to thereby cause the next-printed color image to be aligned with the previously printed color image. In this manner, the electro-optical control of each successively printed latent image formed on the photoconductive drum is responsible for the above alignment and paper correction without requiring complex mechanical schemes to accomplish same.

10 Claims, 8 Drawing Sheets

METHOD AND SYSTEM FOR COMPENSATING FOR PAPER SHRINKAGE AND MISALIGNMENT IN ELECTROPHOTOGRAPHIC COLOR PRINTING

TECHNICAL FIELD

This invention relates generally to registration compensation methods for paper shrinkage and paper position misalignment in electrophotographic (e.g. laser) printers and more particularly to such methods using closed loop feedback

BACKGROUND ART

In the field of electrophotographic color printing, prior art methods of reconstructing a color image have employed processes wherein a series of single color images are first written and developed in sequence on a photoconductive member and then transferred from the photoconductive member via a transfer member, such as a transfer belt or transfer drum, to a print media, such as paper. The primary colors of cyan, yellow, magenta and black (C, Y, M, and K) are commonly used in laser printers for this purpose, and the C, Y, M, and K images are superimposed one upon another on paper to form a composite color image which is then fused or fixed into the paper. This type of electrophotographic or laser printing process is disclosed and claimed in co-pending application Ser. No. 515,946 of C. S. Chan et al filed Apr. 27, 1990, assigned to the present assignee and incorporated herein by reference.

In comparison to the well developed monochromatic image development and transfer processes in the field of electrophotography wherein a single black and white image is first formed on a photoconductive drum and then transferred in a single pass process and fused into the paper, this type of multiple color and multiple pass electrophotographic printing process presents many completely new and different technical problems and challenges to workers in this relatively new and rapidly developing art. More particularly, instead of having to be concerned with only the transfer of a single color image from a photoconductive drum by a transfer drum to paper and fused therein, there are instead now four color images of cyan, yellow, magenta and black in this multiple color-multiple pass process that have to be transferred from the photoconductive drum via the transfer medium to the paper. These requirements greatly increase the complexity of the overall color printing process as a result of the multiple image color development, color mixing and the handling of the four (C, Y, M, and K) non-fused wet toners at one time which is involved in the above color image superimposition processes.

Previously, color and multiple image electrophotographic processes have been developed wherein the above primary color images are fused or fixed into the print medium before a subsequent primary color image is superimposed thereon. Examples of such processes are disclosed in U.S. Pat. No. 4,783,681 issued to Tanaka et al and in U.S. Pat. No. 4,799,086 issued to Koike et al, both assigned to Canon of Japan. However, these prior systems are rather complex mechanically and neither of these prior systems provide for paper shrinkage compensation during the media fusion process thereon. In addition, the paper registration compensation process disclosed in Koike et al U.S. Pat. No. 4,799,086 employs mechanical means rather than electronic image control compensation for the subsequently printed images, thereby making its registration accuracy less than completely reliable in all cases. In addition, the construction of the apparatus in Koike et al is inherently more expensive than the image control compensation system of the present invention to be described herein.

DISCLOSURE OF INVENTION

The general purpose and principal object of the present invention is to provide a new and improved electrophotographic color printing process wherein the above overall process complexity of the multiple color image development and color mixing has been greatly reduced, thereby improving the resultant print quality and resolution of the printed color image while significantly reducing the cost of the process.

To accomplish this object and purpose, there has been developed a new and improved color printing process wherein images of each of the above cyan, yellow, magenta and black colors are developed serially on a photoconductive drum, then separately transferred to paper where they are individually fused or fixed before a second (Y), third (M), and fourth (K) color images are processed in a like manner. In this process, each successive color image is brought into precise alignment with the preceding image or images. In this manner, the novel multiple pass color printing process described herein is reduced in color image development and color mixing complexity to one more resembling current state-of-the-art single image electrophotographic printing processes. That is, each successive color image which is developed in accordance with the present invention is printed and fixed on a dry paper instead of a just-developed wet paper. This feature in turn greatly reduces the overall process complexity of the present method and imparts to it characteristics more closely resembling present day monochromatic image forming processes.

Each successive fixing or fusing of the separate color images into the paper as described above may cause the paper to shrink in both the horizontal and vertical dimensions. In addition, the movement of the paper past the image transfer drum multiple times during the composite color image forming process can cause paper misalignment and shifting in all of the horizontal, vertical and angular directions with respect to the direction of paper motion. Accordingly, compensation for these positional errors is provided in accordance with the present invention and is made possible and practical by the provision of a novel closed looped error correction method and system. Using this system and method, directional errors in all of the above horizontal, vertical and angular dimensions and positions are corrected in preparation for each image-on-image superimposition on the paper after each successive fusing thereof.

Accordingly, another object of this invention is to provide a new and improved multiple pass electrophotographic color printing process of the type described wherein near perfect alignment and registration is provided for each successively printed image with the previously printed and fused images. To accomplish this object and purpose, there has been developed a new and improved method of electrophotographic color image registration control which includes, among other things:

a. providing a reference area on a print medium, such as paper, with reference dimensions, positions and orientation, respectively of X, and Y, and x, y, and Θ, b. printing a color image in this reference area, c. fusing the color image into the print medium to thereby introduce a dimensional change in one or more of the original X, Y, x, y, and Θ reference dimensions positions and orientation to obtain one or more new dimensions positions, and orientation of X′, Y′, x′, y′, and Θ′, d. measuring any changes between the original X, Y, x, y, and Θ values and the new X′, Y′, x′, y′, and Θ′ values to thereby in turn generate corresponding X′, Y′, x′, y′, and Θ′ error signals, and e. processing the X′, Y′, x′, y′, and Θ′ error signals in a closed loop feedback arrangement in such a manner as to write the next succeeding latent color image on a photoconductive drum with the new dimensions X′, and Y′, the new position x′ and y′ and the new orientation Θ′. This color image is then transferred from the drum to the paper in near-perfect registration with the previously formed color image.

The present invention is also directed to a novel system combination which includes means for providing each of the above steps a. through e., and this system is more particularly defined in the means-plus-function closed loop system combination to be described and in the claims appended hereto.

Another object of this invention is to provide a new and improved feedback control system and method of the type described which may be constructed and implemented using reliable and commercially available off-the-shelf electronic components and connected as shown in the preferred embodiments illustrated in the accompanying drawings.

Another object of this invention is to provide a new and improved feedback control system of the type described which is relatively economical in construction, reliable in operation, and readily adaptable for use with a variety of diverse-type multiple pass electrophotographic color printers.

A unique feature of this invention is the provision of a novel means and method for controlling the superposition of successively printed images using a laser beam in a laser color printer wherein a first image is printed on a sheet of paper and then fused into the paper in preparation for the printing of a second image thereon. The video frequency and scan speed of the laser beam may be varied in a controlled manner to provide image coincidence between these first and second images, as well as additional single color images printed in succession thereon.

Another feature of this invention is the provision of the additional control and variation of the rotational velocity of a photoconductive drum within the laser printer, and the utilization of such control in combination with the above control of laser beam scan speed and video frequency. The ability to separately control these three parameters imparts good overall flexibility of image-on-image control in accordance with the teachings of this invention.

Another feature of this invention is the provision of an adjustment of the axis of the laser scanner in order to adjust for corresponding changes in orientation or angular shift Θ′ of the successive images superimposed upon one another.

Another feature of this invention is the provision of means for controlling the timing in which video data is sent to a laser control unit to adjust for linear shifts (x′ and y′) of the successive color superimposed upon one another.

The above and other objects, features, and advantages of this invention will become more readily apparent in the following description of the accompanying drawing.

DETAILED DESCRIPTION OF THE PREFERRED EMBODIMENT

Figure 1:
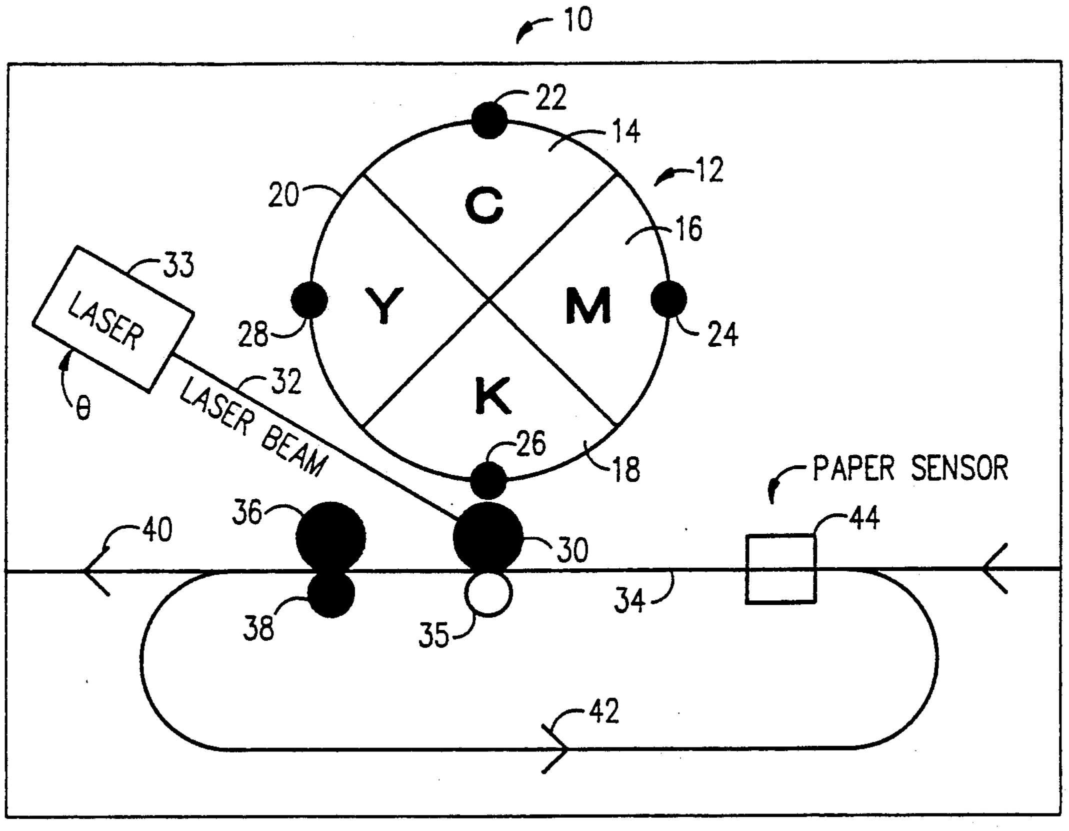
FIG. 1 is a schematic diagram of an electrophotographic printing apparatus useful for printing a series of multiple color images on a print medium and of the type where the above problems of paper shrinkage and misalignment may develop.

Referring now to FIG. 1, there is shown an electrophotographic color printer designated generally as 10 and includes, for example, a multiple color carousel 12 having a plurality of primary color development units 14, 16, 18, and 20 therein. The cyan, magenta, black, and yellow primary color units 14, 16, 18, and 20, respectively, may for example include rollers 22, 24, 26, and 28, respectively, used for applying the different colored toners indicated to the surface of a photoconductive drum 30. The different colored images of cyan, magenta, yellow, and black are developed in sequence on the surface of the photoconductive drum 30 by the writing thereon with a laser beam 32 which is projected from a laser source 33 as is well known in the art. The paper 34 passes horizontally from right to left between the photoconductive drum 30 and a transfer roller 35 in the formation of each successive color image.

For a further description of the color image development and transfer process which takes place on the surface of the photoconductive drum 30 and on the print media 34, reference may be made to the commonly assigned co-pending application Ser. No. 515,946 of C. S. Chan et al, identified above or to the references cited therein.

After each separate color image is developed on the photoconductive drum 30 and then subsequently transferred to a print medium such as the paper 34, each image is fused or "fixed" into the paper 34 by means of heat and pressure applied by the fuser elements indicated by the rollers 36 and 38. These rollers 36 and 38 are in direct contact with the paper 34 traveling in the direction indicated by the arrow 40. After each successive image is fused or fixed into the paper 34 by the fuser elements 36 and 38, the paper continues to traverse the path indicated by the arrow 42 and then passes through a paper position sensor 44 and back to direct contact with the photoconductive drum 30. The drum 30 has now been brought into contact with the next adjacent developer unit 16 in the carousel 12 and is now ready for application of the color toner of magenta, for example, by the rotation of the roller 24 against the surface of the photoconductive drum 30. It will be understood, of course, that the photoconductive drum must undergo conventional discharging, cleaning and charging processes after the application of each different color of toner thereto and the transfer of these toners to the print medium 34. These processes are described in more detail in the above identified co-pending application of C. S. Chan et al.

As described in more detail below, the paper position sensor 44 is operative to sense a variation in shrinkage and misalignment of a predefined print area receiving the superimposed color images in the X and Y directions and in the x, y, and Θ image positions described as follows. The Y direction means the original and preferred direction of paper motion which is also referred to as the vertical dimension, the X direction means the direction of paper width perpendicular to the Y direction and this is referred to as the horizontal dimension, the x and y positions are the coordinate positions of the left hand corner of the paper, and Θ is the angle of skew of the paper with respect to the Y direction.

Figure 2A:
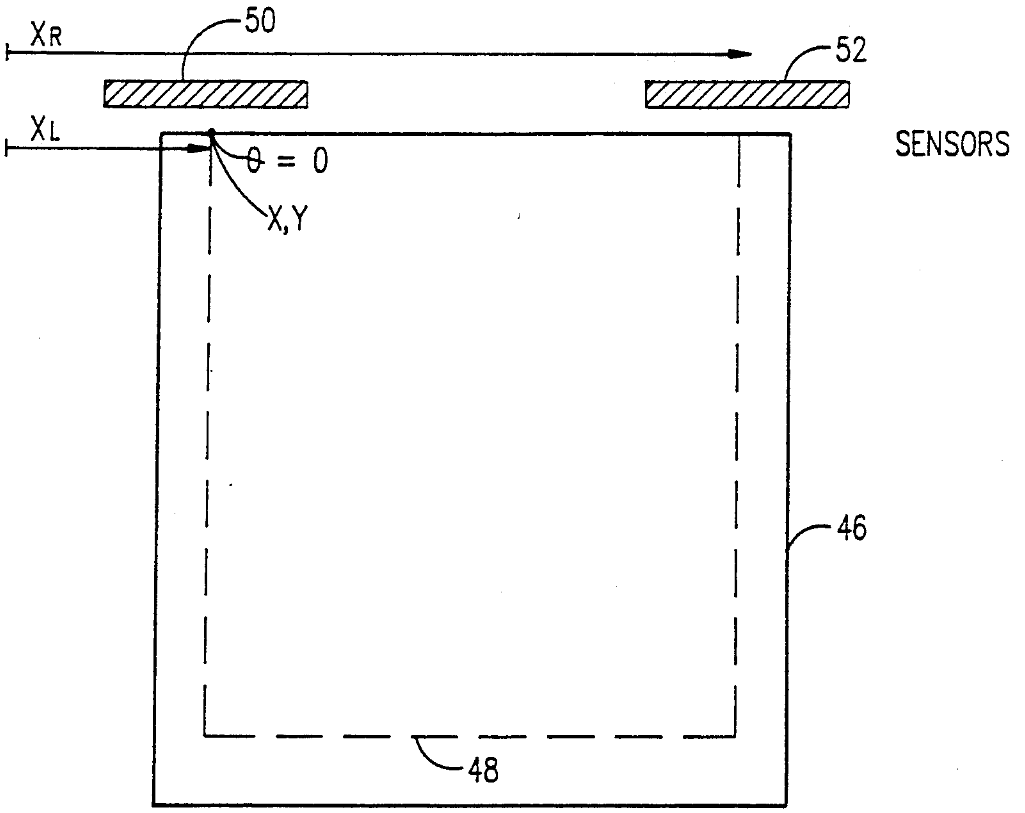
FIGS. 2A and 2B are diagrams which illustrate a condition showing the detection of paper shrinkage in only the X (paper width) and Y (paper motion) direction and misregistration in the x position.

Referring now to FIG. 2A, there is shown a reference page or area of print 46 having its original width and length dimensions and outer boundary surrounding an interior shrunken page identified by the dotted line 48. The X and Y dimensions of the shrunken page 48 and its x and y upper left hand position coordinates have been moved inwardly by the amount shown so as to define a left hand margin dimension in the X direction, or $X_L$, and a right hand margin dimension $X_R$ measured horizontally as shown in FIG. 2A. In this figure, there has been no skew of the shrunken page 48, so the value for the angle Θ is indicated as 0.

Figure 2B:
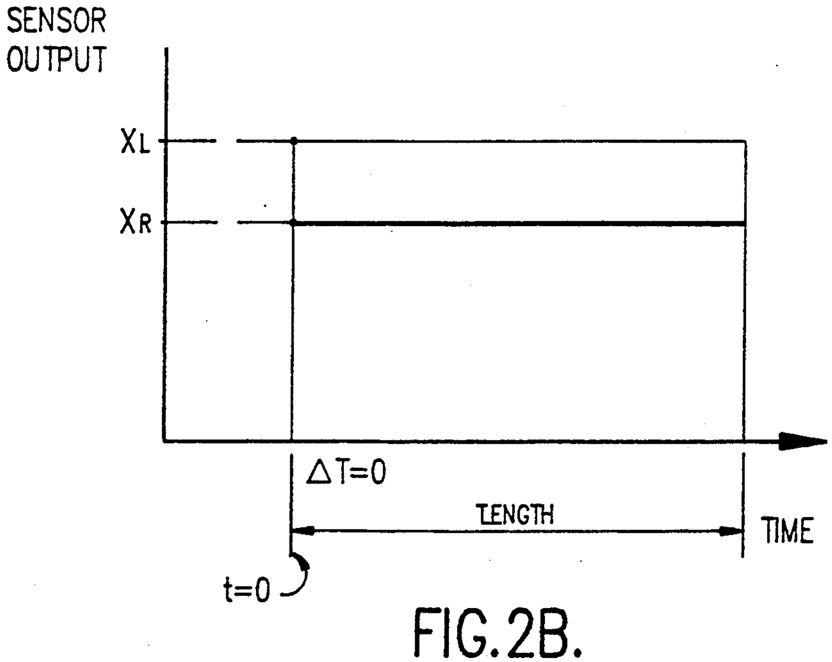

A pair of optical sensors 50 and 52 are positioned as shown on the left and right hand sides of the sheet 48 passing adjacent thereto. These sensors 50 and 52 are operative to generate the $X_L$ and $X_R$ voltage outputs as indicated in FIG. 2B, beginning at the time t=0 when the page 48 passes underneath or otherwise adjacent to the two sensors 50 and 52. Since the left hand corner of the page 48 is sensed by a different area of the sensor 50 as compared to the active sensing area of the sensor 52, the two different voltage characteristics $X_L$ and $X_R$ will be generated as indicated in FIG. 2B for the time that any portion of the page 48 is beneath the sensors 50 and 52. Thus, the output voltage signals shown in FIG. 2B may be processed in the closed loop systems shown in FIGS. 4 and 5 below to assure that the next-printed image is in fact lined up with the dotted line 48 of FIG. 2A.

Figure 3A:
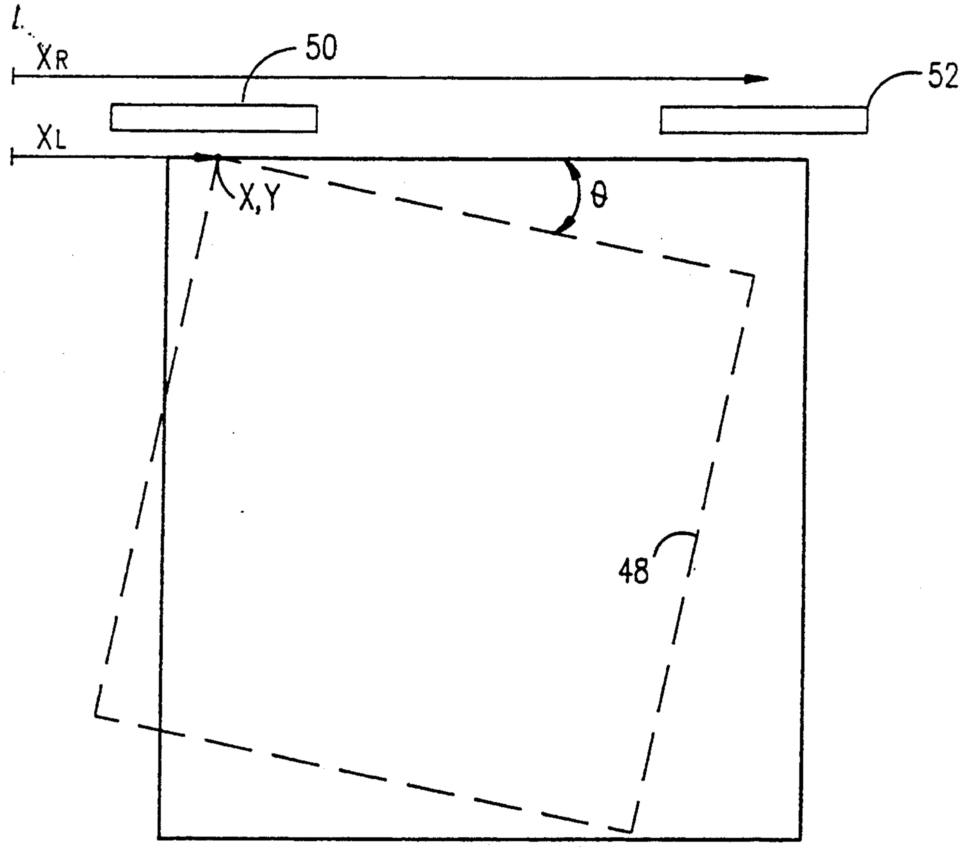
FIGS. 3A and 3B are diagrams which illustrate a condition showing the detection of paper shrinkage in the X, and Y directions as well as misregistration in the x and y positions and Θ orientation.
Figure 3B:
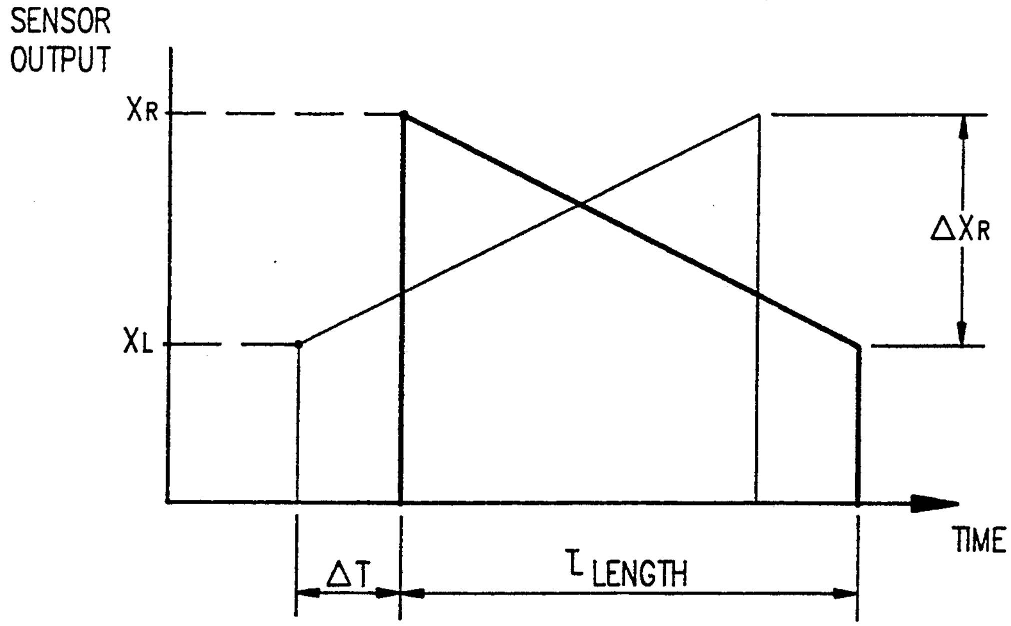

Referring now to FIGS. 3A and 3B, these figures illustrate a condition where the page 48 has been skewed at an angle Θ with respect to horizontal. Therefore, when the page 48 in FIG. 3A passes beneath the two sensors 50 and 52 therein, the linear variation in active sensing surface area of the two sensors will generate the $X_L$ and $X_R$ output voltage characteristics or signals illustrated in FIG. 3B. The linear time variation of these signals in FIG. 3B represents area of paper 48 per unit of time entering the optical sense field of view of the two sensors 50 and 52. In this manner, these voltage signals in FIG. 3B can be used in a manner described below to provide error correction for the skew angle Θ as defined in FIG. 3A, as well as the dimensions X and Y and the positions of x and y.

Figure 4:
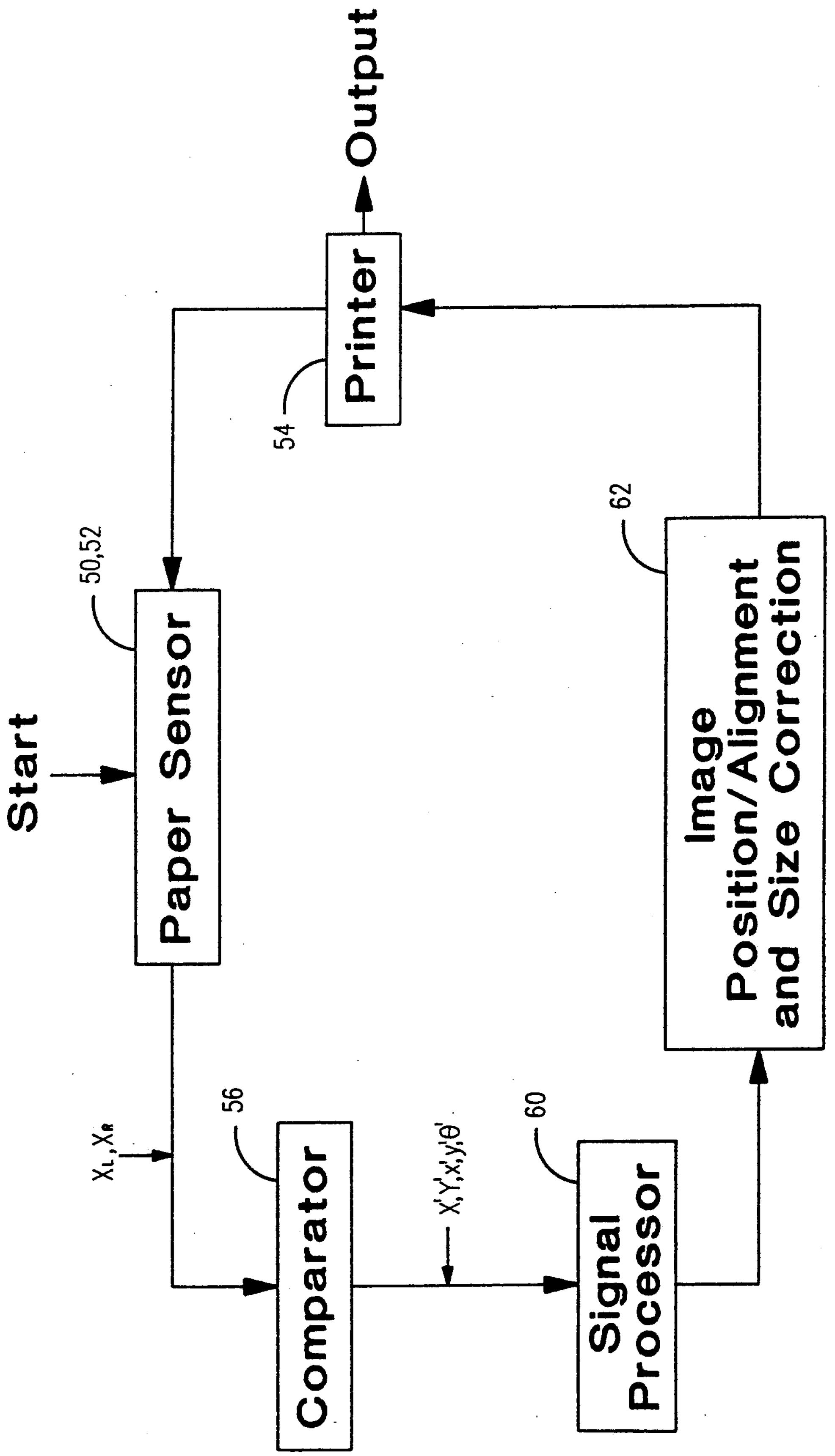
FIG. 4 is a functional block diagram of the image position control system and method according to the present invention.

Referring now to FIG. 4, there is shown a general functional block diagram which describes in broad functional terms the feedback error correction technique and approach in accordance with the present invention. As indicated in FIG. 4, the paper sensors 50 and 52 will sense the position of the print media 54 to in turn generate $X_L$ and $Y_R$ signals which are applied to the input of a comparator stage 56. In the comparator stage 56 information on the originally correct position and size is compared with the actual $X_L$ and $Y_R$ information at the output of the paper sensor 50, 52, and the comparator 56 in turn generates output error signals X', Y', x', y', and Θ' applied to a signal processor 60. The signal processor 60 is in turn connected to an image position/alignment/size correction stage 62 which serves to provide paper orientation correction signals to the next image printed on the print media 54 as will be described in further detail below.

Figure 5:
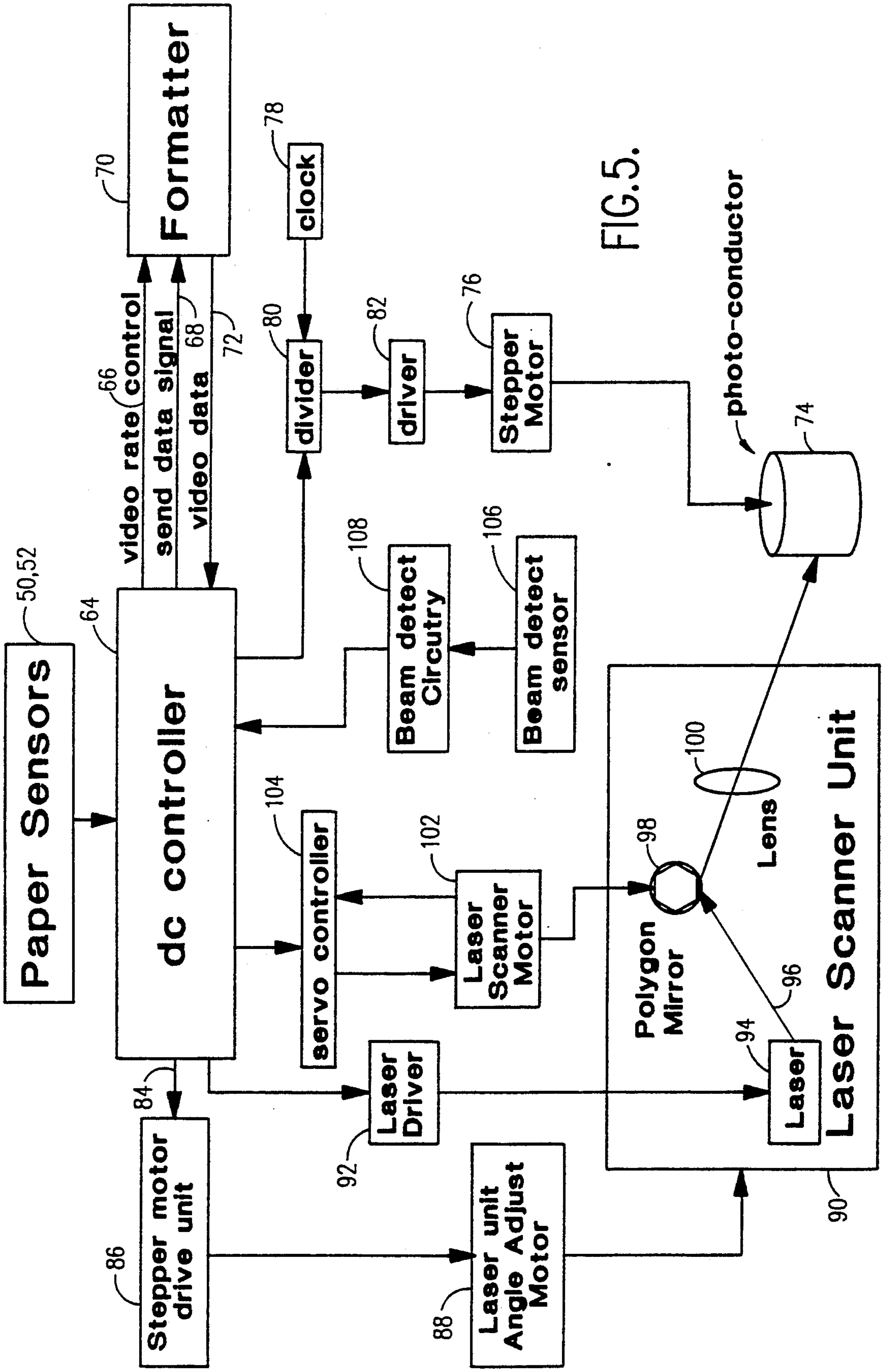
FIG. 5 is a functional block diagram of a preferred system embodiment of the invention when employing laser printing. This system is operative to transfer multiple single color images in precise alignment from a rotating photoconductive drum to an adjacent transfer medium.

Referring now to FIG. 5, the paper sensors 50 and 52 are connected to provide the $X_L$ and $X_R$ direction, position and orientation information to a DC controller 64. The DC controller 64 is connected by way of a video rate control output line 66 and a send data signal output line 68 to a formatter stage 70. The formatter stage 70 in turn sends back video data by way of a return line 72 to the DC controller 64.

The DC controller 64 is further connected in the manner shown in FIG. 5 to control the speed of a photoconductive drum 74 of a laser printer. The photoconductive drum 74 is driven by a stepper motor 76 which is controlled by a clock stage 78, a frequency divider 80 and a power driver 82. The DC controller 64 is further connected by way of an output line 84 to a stepper motor drive unit 86. The unit 86 is operative to adjust the motor angle in stage 88 and it is mechanically linked to the laser scanner unit 90. The DC controller 64 is further connected to a laser driver stage 92 which is operative for pulsing a laser beam source 94, such as a solid state diode. The laser source 94 is focused to project the laser beam 96 indicated at the path shown to a polygon mirror 98 from which it is scanned and reflected through a lens 100 to impinge on the surface of the photoconductive drum 74.

A laser scanner motor 102 is connected as shown to a servo-controller stage 104 which also receives its output from the DC controller 64. In addition, a laser beam detect sensor 106 and associated laser beam detect circuitry 108 is connected to provide input control for the DC controller 64 in a manner to be further described.

In operation, the paper sensors 50 and 52 pass the $X_L$ and the $X_R$ voltage signal information defined in FIGS. 2A and 2B and in FIGS. 3A and 3B above to the DC controller 64, and the DC controller 64 generates the multiple X, Y, Θ, x, y error signals and selectively transmits these signals to the various stages in FIG. 5 identified above. The left hand corner x and y position information (as a function of time) is sent to the formatter stage 70 by way of the send data signal line 68. The X and Y signals are sent either to the formatter stage 70 in the form of video rate control data, or to the servo-controller stage 104 to operate and to adjust the laser scanner motor 102, or both. The vertical Y signal data indicative of page speed is sent via the DC controller 64 to the frequency divider stage 80 and is operative to change the speed of the stepper motor 76 and thus change the rotational velocity of the photoconductive drum 74.

Figure 6A:
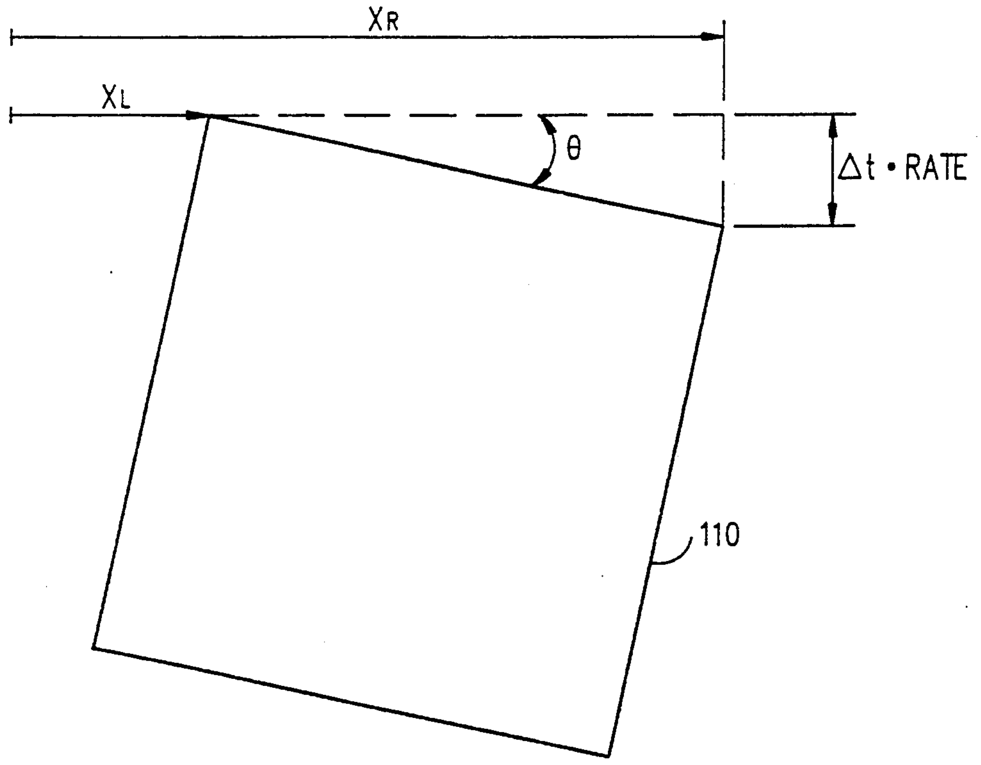
FIGS. 6A and 6B are diagrams which illustrate the calculation of the corrections required in the video rate, laser beam scan speed, rotational velocity of the photoconductor, the timing of the send video data signal and the angular change, Θ′ from the various parameters identified in FIGS. 2A and 2B and 3A and 3B above.
Figure 6B:
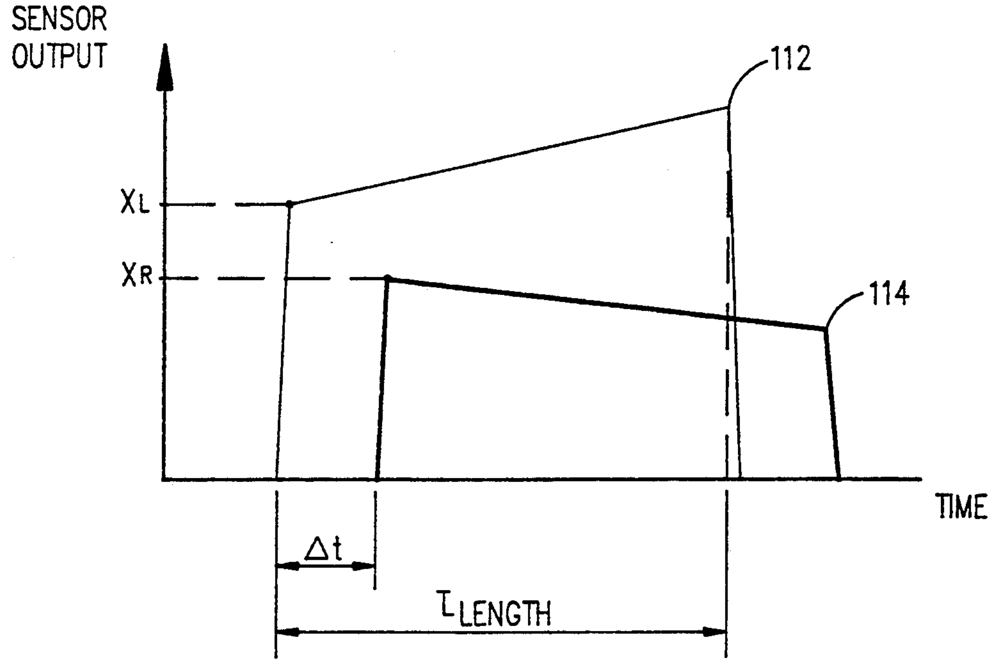

Referring now to FIGS. 6A and 6B, FIG. 6A shows the $X_L$ and $X_R$ distances to the left and right hand upper corners of a sheet of paper 110 which has been skewed to small angle Θ. Thus, when the sheet passes beneath the left hand and right hand sensors 50 and 52, the $X_L$ and $X_R$ voltage characteristics of FIG. 6B are generated. It is seen in FIGS. 6A and 6B that the paper feed rate, or paper travel distance divided by time is related to the tangent of Θ in accordance with the following expression:

$$t \cdot \text{Rate} \div (X_R - X_L) = \tan \Theta \quad \{\approx \Theta \text{ (for small angles)}\}$$

The paper width dimension X is as $(X_R - X_L) + \cos \Theta$, and the length of the paper Y may be calculated by assuming that the change in paper width is proportional to a constant times the change in paper length. Alternatively, the length of the paper may be measured in accordance with the following relation.

$$Y = \tau \text{ length} \cdot \text{paper feed rate} \div \cos \Theta$$

The x variable is equal to $X_L$. The y variable is always equal (y=y'), since the position of the sensor determines y and starts the timing process.

Figure 7:
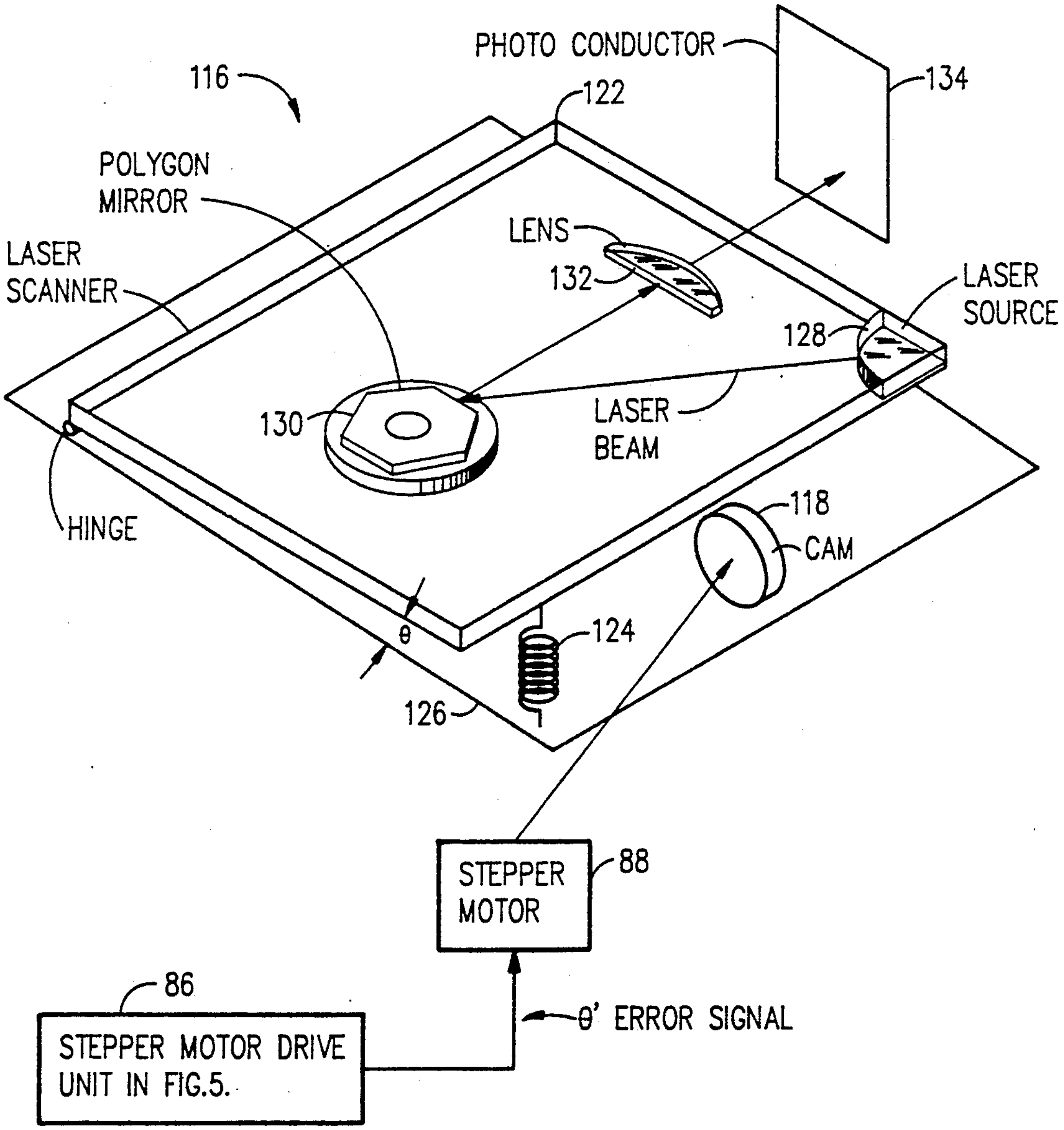
FIG. 7 is an abbreviated diagram showing how the hinge angle Θ of a laser scanner can be varied to adjust for changes in image orientation angle Θ′ in the successively printed images.

Referring now to FIG. 7, the schematic diagram in this figure shows how the hinge angle Θ of a laser scanner 116 may be varied by the operation of a cam 118 which is driven by a stepper motor 120. The laser scanner 116 will typically include a housing 122 which is secured by means of a spring 124 or the like to a support member 126. The laser scanner 116 will typically include a source of laser light 128, polygon optics 130 for deflecting the laser light through a lens 132 and onto the print medium 134. Thus, by varying the position of the cam 118 by the use of the stepper motor 120, the laser scanner plane angle Θ may be changed to compensate for changes from Θ to Θ' in the misorientation of the previously printed image.

A specific example of a typical error correction process is as follows:

Assume that the output of the detectors 50 and 52 result in the new values of x', y', X', Y', and Θ'. The following is one scenario for the corrections which must be made in order to compensate for the changes in paper dimension and position. (Assume that the scanner shown in FIG. 7 hinges on the left side with respect to FIG. 6A).

Θ—Correction

Change scanner plane angle to Θ'.

Width Correction

Change video rate by the ratio of X−X'/X

Length Correction

Change paper drive motor speed by the ratio of Y'−Y/Y

Leading Edge Position

Delay first send data signal timing by y'−y/Rate seconds

Left Edge Position

Delay each send data signal timing by $$\frac{(x' - x) - \text{Rate} \cdot \text{Time} \cdot \tan \Theta}{\text{scanning rate}}$$

where the scanning rate is the rate at which the laser beam sweeps across the photoconductor in units of distance divided by time.

However, other combinations of the previously identified variables of scanner speed, motor speed, video rate, send video data signal and the scanner plane angle shown in FIG. 7 can also be used to provide the proper registration.

Thus, the DC controller 64 performs all of the calculations to determine the values of x, y, X, Y, and Θ and then will take this information, such as X and Y data and make adjustments for paper shrinkage by changing the speed of the photoconductor 74 and thus controlling paper speed. Another way to adjust for shrinkage changes in the Y direction is by controlling the laser scanner frequency, and this is done when the DC controller 64 sends out a voltage to the servo-controller stage 104 which in turn controls the speed of the laser scanner motor 102. A feedback signal is applied to the DC controller 64 from the laser scanner motor 102 ensure that the laser scanner motor 102 is running at the proper speed. If it is not running at the proper speed, the DC controller 64 will operate to increase that voltage and correct the scanner to again operate at the correct speed and corresponding to the output voltage from the DC controller 64. This closed loop operation will thereby serve to correct for the paper shrinkage in both the X and Y directions.

Normally, the formatter stage 70 will send out video data on the video data line 72 at a given frequency, and this video rate control data 66 will allow the DC controller 64 to input to the formatter some other chosen video rate. This operation will serve to compress the printed image. Therefore, if you increase the video rate and keep everything else constant, the printed image will be compressed in the X direction. Again, for shrinkage we have these above three corrections to make and any combination of the above parameters may be used. They are namely, the video rate control which determines the video data rate on line 72, the stepper motor speed of the motor 76 which determines the speed of the photoconductive drum 74, and the speed of the polygon mirror 98.

Figure 8:
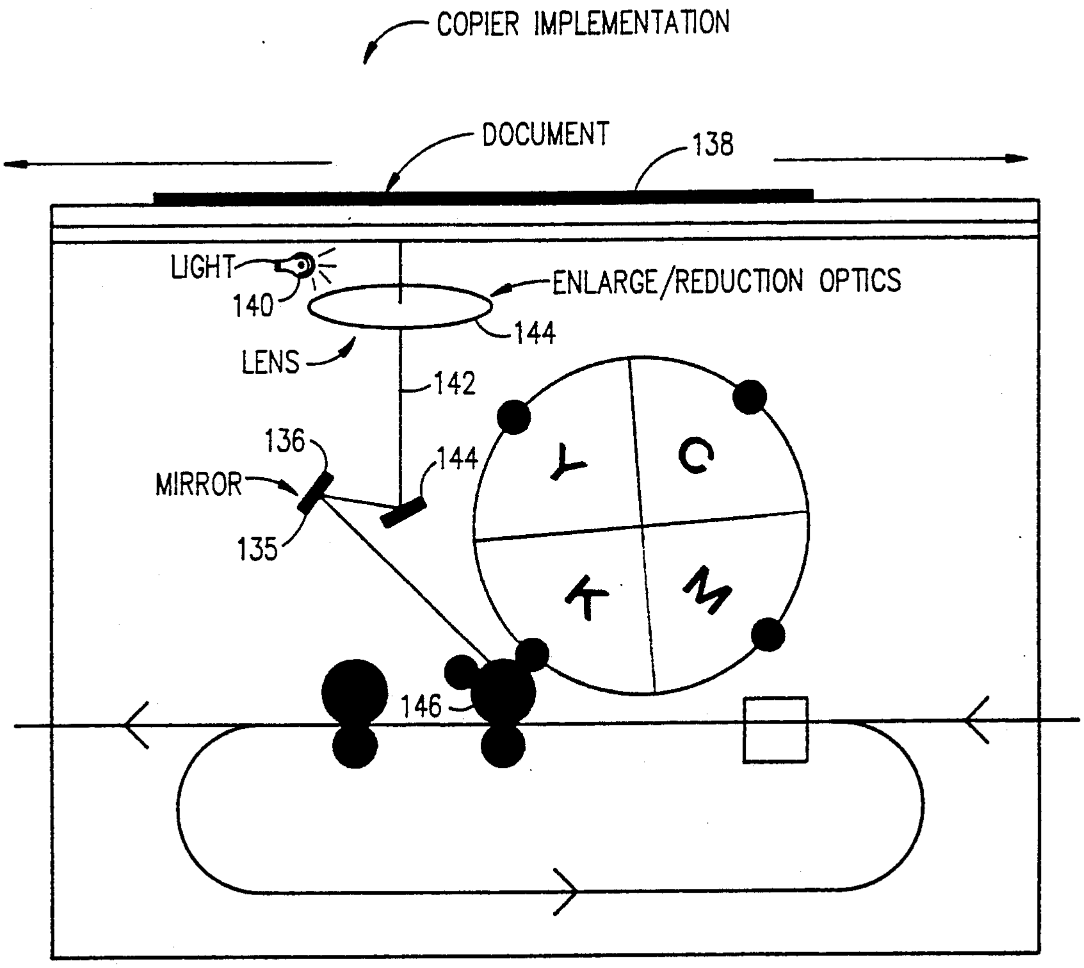
FIG. 8 is a schematic diagram of a color copier implementation which may be used to adjust for X′, Y′, and x′, y′, and Θ′ errors in paper processed in a color copier or like image processing apparatus.

Referring now to FIG. 8, there is shown a color copier embodiment of the present invention. The copier operates in the following manner. The document to be copied is placed upon a moving platform 138 which moves the document over a light source 140. The light is reflected off the document and follows the path 142 through the lens system 144 (which can be adjusted to enlarge or reduce the document) and reflects off the mirrors 144 and 136 and is then imaged on the photoconductor 146. Once the document is imaged on the photoconductor, the procedure to develop the image is the same as for the printer shown in FIG. 1 and explained above.

The color copier embodiment uses the same concept of aligning the various color planes by shifting the new image and sizing it properly on the photoconductor to match the position of the previously developed images. The mechanism of the shift is somewhat different in the copier embodiment. First, the plane of the face 135 of the mirror 136 can be changed to produce a corresponding change in the angle (theta) and the position x. Secondly, the correction for the shrinkage X and Y is done by the optics in the same way that a conventional copier enlarges and reduces an image as is well known in the art. The Y shrinkage can further be compensated for by changes in the speed of the photoconductor as in the case of the printer embodiment described above. Finally, the y position is corrected for by delaying or advancing the motion of the top moving platform which contains the original document.

Various modifications may be made in and to the above described embodiments without departing from the spirit and scope of this invention. For example, various types of paper position sensors such as slit-type sensors or discreet sensors such as charge coupled devices may be used in the above described embodiments. In addition, the paper shrinkage adjustment and compensation control methods disclosed and claimed herein may be applied to color copiers as well as color printers.

Although the system and method described above has its dimensions referenced to the edge of a page, this method and system described and claimed herein may be used by reading registration or other reference marks on the paper, either on the printed side of the paper or on the reverse side thereof. These marks may be formed in either toner or ink and may be visible or invisible to the naked eye. These registration marks can have the advantage of allowing for adjustment of local shrinkage as well as global shrinkage. However, they would be used in the same way as the above paper edge information is processed, except that the shrinkage toward the center of the paper may be different than the shrinkage near the edge of the paper. Thus, interior reference or alignment marks can be employed to allow the system to better compensate for local shrinkage.

It is also within the scope of the present invention to use single pass as well as multiple pass systems. That is to say, the present invention can be used to assure the exact registration of print on any single page, and this may be desirable, for example, in the case of printing on preprinted forms. Single pass systems will also be useful in the case of multiple input bin printers where the paper must travel a long distance before reaching the photoconductor and therefore has more travel distance over which to skew or shift from an original correct position and orientation.

Accordingly, such above design modifications are clearly within the scope of the following appended claims.

I claim:

1. A method for controlling the alignment of images successively printed on a sheet of print media which includes the steps of:

a. printing a first image on a sheet of paper,
b. fusing said first image into said sheet of paper and thereby producing a contraction or expansion of said sheet of paper and a shift in the position or orientation or both of a predetermined print area thereon with respect to a predefined size, position and orientation of a reference print area,
c. comparing the position and size of said fused print area with the position and size of said reference print area for thereby generating one or more error signals indicative of the expansion or contraction of said fused print area with respect to said reference print area, and
d. processing said one or more error signals in such a manner as to cause each successively printed single color image to be physically aligned on said print media with each preceding printed image.

2. The method defined in claim 1 wherein the processing of said one or more error signals includes generating an image position correction signal and utilizing said image position correction signal to precisely align successively printed images on a print media.

3. The process defined in claim 2 which further includes the steps of:

a. providing a photoconductive drum for developing and transferring a series of single color images to said paper,
b. driving said photoconductive drum at a controlled rotational velocity,
c. generating an image writing laser beam at a controlled scan speed and frequency, and
d. varying one or more of said parameters of drum rotation velocity, laser beam scan speed, laser beam writing frequency, send data signal timing, and laser scanner phase angle to thereby control the size, position and orientation of each image successively printed on said paper.

4. A method for precisely aligning images of different colors written by a light beam impinging on a photoconductive drum and transferred from said photoconductive drum to an image receiving member, which comprises the steps of:

a. comparing a shift in alignment or position of a first transferred image with respect to a predetermined reference area or boundary to thereby generate one or more error signals, and
b. utilizing said one or more error signals to control one or more of the parameters of light beam scan rate, light beam video rate or writing frequency, or the photoconductive drum rotation velocity to thereby develop each successive color image on said photoconductive drum at a position and alignment that will cause said image to be precisely transferred and matched in coincidence with the position and alignment of each color image previously transferred to image receiving transfer member.

5. A system for controlling the alignment of images successively printed on a sheet of print media which comprises:

a. means for printing a first image on a sheet of paper,
b. means for fusing said first image into said sheet of paper and thereby producing a contraction or expansion of said sheet of paper and a shift in the position or orientation or both of a predetermined print area thereon with respect to a predefined size, position and orientation of a reference print area, c. means for comparing the position and size of said fused print area with the position and size of said reference print area for thereby generating one or more error signals indicative of the expansion or contraction of said fused print area with respect to said reference print area, and d. means connected to said comparing means for processing said one or more error signals in such a manner as to cause each successively printed single color image to be physically aligned on said print media with each preceding printed image.

6. The system defined in claim 5 wherein said means for processing of said one or more error signals includes means for generating an image position correction signal and means connected to said generating means for utilizing said image position correction signal to precisely align successively printed images on a print media.

7. The system defined in claim 6 which further includes:

a. means for providing a photoconductive drum for developing and transferring a series of single color images to said paper, b. means coupled to said drum for driving said photoconductive drum at a controlled rotational velocity, c. means for generating an image writing laser beam at a controlled scan speed and frequency, and d. means for varying one or more of said parameters of drum rotation velocity, laser beam scan speed, laser beam writing frequency, send data signal timing, and laser scanner tilt angle to thereby control the size, position and orientation of each image successively printed on said paper.

8. A system for precisely aligning images of different colors written by a light beam impinging on a photoconductive drum and transferred from said photoconductive drum to an image receiving member, which comprises:

a. means for comparing a shift in alignment or position of a first transferred image with respect to a predetermined reference area or boundary to thereby generate one or more error signals, and b. means connected to said comparing means for utilizing said one or more error signals to control one or more of the parameters of light beam scan rate, light beam video scan or writing frequency, or the photoconductive drum rotation velocity to thereby develop each successive color image on said photoconductive drum at a position and alignment that will cause said image to be precisely transferred and matched in coincidence with the position and alignment of each color image previously transferred to image receiving transfer member.

9. A method for controlling the alignment of color images successively printed on paper or the like which comprises the steps of:

a. providing a reference area on a print medium, such as paper, with reference dimensions, positions and orientation, respectively of X, and Y, and x, y, and Θ, wherein Y is defined as the original and preferred direction of paper motion, X is defined as the direction of paper width perpendicular the Y direction, x and y define the coordinate positions of one corner of a sheet of paper, and Θ is the skew angle of the paper with respect to the Y direction, b. printing a color image in said reference area, c. fusing the color image into the print medium to thereby introduce a dimensional change in one or more of the original said X, Y, x, y, and Θ reference dimensions positions and orientation to obtain one or more new dimensions positions, and orientation of said X', Y', x', y', and Θ, d. measuring any changes between the original said X, Y, x, y, and Θ values and the new said X', Y', x', y', and Θ' values to thereby in turn generate corresponding said X', Y', x', y',and Θ' error signals, and e. processing said X', Y', x', y', and Θ' error signals in a closed loop feedback arrangement in such a manner as to write the next succeeding latent color image on a photoconductive drum with the new dimensions X', and Y', the new position x' and y' and the new orientation Θ'.

10. A system for controlling the alignment of color images successively printed on paper or the like which comprises:

a. means for providing a reference area on a print medium, such as paper, with reference dimensions, positions and orientation, respectively of X, and Y, and x, y, and Θ, wherein Y is defined as the original and preferred direction of paper motion, X is defined as the direction of paper width perpendicular the Y direction, x and y define the coordinate positions of one corner of a sheet of paper, and Θ is the skew angle of the paper with respect to the Y direction, b. means for printing a color image in said reference area, c. means for fusing the color image into the print medium to thereby introduce a dimensional change in one or more of the original said X, Y, x, y, and Θ reference dimensions positions and orientation to obtain one or more new dimensions positions, and orientation of said X', Y', x', y', and Θ', d. means for measuring any changes between the original said X, Y, x, y, and Θ values and the new said X', Y', x', y', and Θ' values to thereby in turn generate corresponding said X', Y', x', y',and Θ' error signals, and e. means connected to said measuring means for processing said X', Y', x', y', and Θ' error signals in a closed loop feedback arrangement in such a manner as to write the next succeeding latent color image on a photoconductive drum with the new dimensions X', and Y', the new position x' and y' and the new orientation Θ'.

* * * * *